United States Patent
Cheung et al.

(10) Patent No.: US 12,110,410 B2
(45) Date of Patent: Oct. 8, 2024

(54) WATER-RESISTANT ACRYLIC COATINGS

(71) Applicant: BIMIC LLC, Dallas, TX (US)

(72) Inventors: Wilson Cheung, Hillsborough, NJ (US); Benjamin Pearl, Morristown, NJ (US); Kihyun Kim, Hackensack, NJ (US); Adam Chich, Kearny, NJ (US); Daniel E. Boss, Morristown, NJ (US); Michael Hagen, Parsippany, NJ (US)

(73) Assignee: BMIC LLC, Dallas, TX (US)

( * ) Notice: Subject to any disclaimer, the term of this patent is extended or adjusted under 35 U.S.C. 154(b) by 416 days.

(21) Appl. No.: 17/244,540

(22) Filed: Apr. 29, 2021

(65) Prior Publication Data

US 2021/0253892 A1    Aug. 19, 2021

Related U.S. Application Data

(63) Continuation-in-part of application No. 16/944,880, filed on Jul. 31, 2020, now Pat. No. 10,995,233.

(60) Provisional application No. 62/881,995, filed on Aug. 2, 2019, provisional application No. 63/015,963, filed on Apr. 27, 2020.

(51) Int. Cl.
*B32B 5/02* (2006.01)
*C09D 133/08* (2006.01)
*E04D 7/00* (2006.01)

(52) U.S. Cl.
CPC ............. *C09D 133/08* (2013.01); *B32B 5/02* (2013.01); *E04D 7/00* (2013.01); *B32B 2255/02* (2013.01); *B32B 2255/26* (2013.01); *B32B 2419/06* (2013.01)

(58) Field of Classification Search
CPC ..... C09D 133/08; B32B 5/02; B32B 2255/02; B32B 2255/20; B32B 2419/06; E04D 7/00
See application file for complete search history.

(56) References Cited

U.S. PATENT DOCUMENTS

| | | | |
|---|---|---|---|
| 5,017,632 A | 5/1991 | Bredow et al. | |
| 5,225,453 A | 7/1993 | Yamamori | |
| 5,965,257 A | 10/1999 | Ahluwalia | |
| 7,550,205 B2 | 6/2009 | Getlichermann et al. | |
| 8,741,388 B2 | 6/2014 | Wickert et al. | |
| 8,900,651 B2 | 12/2014 | McClain et al. | |
| 9,073,294 B2 | 7/2015 | Kumar et al. | |
| 9,074,065 B2 | 7/2015 | Rieth et al. | |
| 9,359,520 B2 | 6/2016 | Killilea et al. | |
| 9,371,476 B1 | 6/2016 | Osae et al. | |
| 9,434,828 B2 | 9/2016 | Fuhry et al. | |
| 9,557,449 B2 | 1/2017 | Valeri | |
| 9,850,396 B2 | 12/2017 | Xu et al. | |
| 10,066,051 B2 | 9/2018 | Cochran et al. | |
| 10,093,821 B2 | 10/2018 | Xu et al. | |
| 10,745,583 B2 | 8/2020 | Zhan et al. | |
| 10,927,238 B2 | 2/2021 | Blackman et al. | |
| 10,934,449 B2 | 3/2021 | Shi et al. | |
| 10,947,387 B2 | 3/2021 | Alvarado et al. | |
| 10,995,233 B2 | 5/2021 | Cheung et al. | |
| 11,001,734 B2 | 5/2021 | Young et al. | |
| 11,136,471 B2 | 10/2021 | Jang | |
| 2002/0016405 A1 | 2/2002 | Friel et al. | |
| 2008/0188603 A1 | 8/2008 | Porzio et al. | |
| 2008/0269405 A1 | 10/2008 | Okamoto et al. | |
| 2010/0062260 A1 | 3/2010 | Takano et al. | |
| 2010/0104809 A1 | 4/2010 | Duda et al. | |
| 2012/0088052 A1 | 4/2012 | Rodriguez et al. | |
| 2013/0236674 A1 | 9/2013 | Kim et al. | |
| 2015/0094421 A1 | 4/2015 | Patel et al. | |
| 2015/0132588 A1 | 5/2015 | Killilea et al. | |
| 2016/0096970 A1 | 4/2016 | Hartley et al. | |
| 2016/0194511 A1 | 7/2016 | Perdigon et al. | |
| 2017/0335116 A1 | 11/2017 | Qian et al. | |
| 2020/0270491 A1 | 8/2020 | Li et al. | |
| 2020/0369882 A1 | 11/2020 | Wang et al. | |
| 2020/0399904 A1* | 12/2020 | Vido | B32B 5/26 |
| 2021/0155721 A1 | 5/2021 | Zeng et al. | |
| 2021/0261768 A1 | 8/2021 | Watanabe | |
| 2021/0261812 A1 | 8/2021 | Krall et al. | |

FOREIGN PATENT DOCUMENTS

EP    1036835 A2    9/2000

OTHER PUBLICATIONS

Baumstark et al., Acrylic Latex Paints: a Comparative Study (Part II); European Coating Journal, No. 5, 2001.

* cited by examiner

*Primary Examiner* — Edward J Cain
(74) *Attorney, Agent, or Firm* — GREENBERG TRAURIG, LLP

(57) ABSTRACT

A roofing formulation may comprise a first part and a second part. The first part may comprise a coating material, the coating material comprising at least one acrylic latex resin, at least one functional filler, and at least one hydrophobic additive. The second part may comprise an activator formulation. The roofing formulation may be applied as a coating to a roofing substrate. A roofing system may comprise at least one roof substrate and a multi-layer coating system. The multi-layer coating system may comprise at least one top layer and at least one core layer disposed between the at least one top layer and the at least one roof substrate.

20 Claims, 1 Drawing Sheet

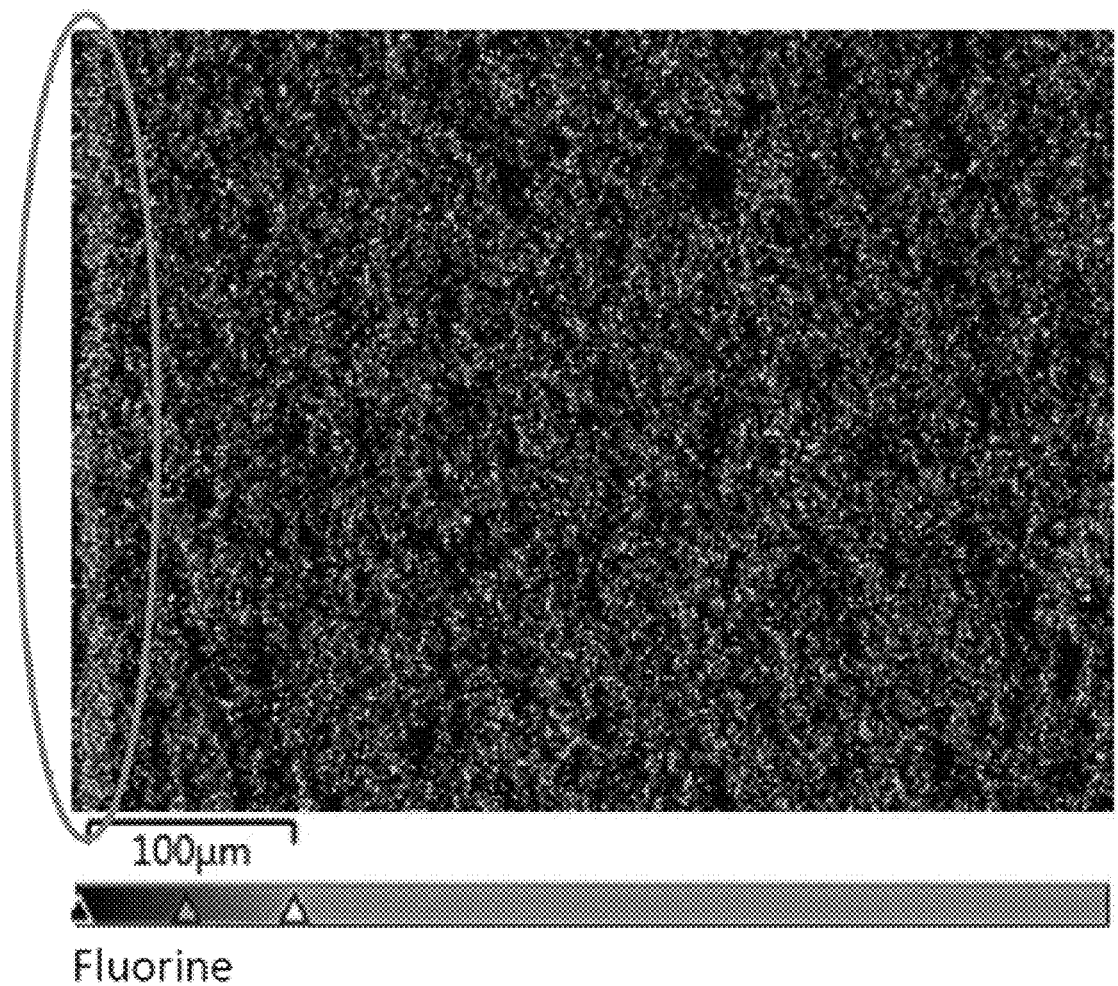

WATER-RESISTANT ACRYLIC COATINGS

CROSS-REFERENCE TO RELATED APPLICATIONS

This application claims priority to U.S. application Ser. No. 16/944,880, filed on Jul. 31, 2020 and entitled "WATER-RESISTANT ACRYLIC COATINGS," which claims priority to U.S. Provisional Application 62/881,995, filed on Aug. 2, 2019 and entitled "WATER-RESISTANT ACRYLIC COATINGS," and U.S. Provisional Application 63/015,963, filed on Apr. 27, 2020 and entitled "WATER-RESISTANT ACRYLIC COATINGS," all of which are herein incorporated by reference in their entirety.

BACKGROUND

Among the most significant properties of commercial and residential roofing systems is water resistance. The durability and service life of roofing systems largely depends upon its ability to prevent water infiltration and to provide sustained mechanical properties, such as wet tensile strength and wet adhesion, in applicable environmental conditions. Ponding is the occurrence of water pooling on flat roofs or localized flat roofing sections from exposure to storms, snow melts, heavy rains or other wet conditions. Generally, conventional roof systems are simply not designed to hold water for prolonged durations. Ponding water can collect dirt, which may cause the growth of vegetation and biofilm or telegraph mud cracking and chipping. It can also act as a magnifying glass on the roof under the pond, thus possibly increasing ultraviolet exposure and causing localized damage. It can also contribute to photo-oxidation and resultant premature deterioration of the roof membrane, flashings and coatings. Ultimately, these and other effects can lead to structural damage and possible roof collapse.

Waterborne roof coatings, most notably acrylic coatings, are commonly used to extend roof service life. Acrylic coatings are eco-friendly and exhibit a combination of benefits including high reflectivity, re-coatability, good adhesion to multiple substrates and desirable mechanical properties. Failures of known acrylic coatings may include micro-cracking, delamination or de-bonding, and biofilm attachment, which can lead to cracking, chipping, etc., and ultimately to structural damage of the underlying roof structure. One of the advantages of the coating materials, systems and methods provided herein is to address these known failures by providing acrylic coating systems that are resistant to ponding water failures while retaining the benefits of waterborne coatings.

SUMMARY

In some embodiments, a roofing formation may comprise a first part, wherein the first part comprises a coating material, the coating material comprising: at least one acrylic latex resin, wherein the at least one acrylic latex resin is selected from the group consisting of hydrophobic resins, self-crosslinking resins, and crosslinkable resins; at least one functional filler; and at least one hydrophobic additive; and a second part, wherein the second part comprises an activator formulation; wherein, when the roofing formulation is applied as a 500 micron dry film thickness coating to a roofing substrate, the coating exhibits a water infiltration depth of 120 microns or less after 4 hours at 60° C. and 95% relative humidity.

In some embodiments, the at least one functional filler is selected from the group consisting of silicate minerals, silica, wollastonite, talc, mica, kaolin, feldspar, nepheline syenite, nanoclays, platy fillers, nano-oxide materials, calcium carbonate, aluminum hydroxide, magnesium hydroxide, aluminum trihydrate, barium sulfate, basalt, zinc oxide, and combinations thereof.

In some embodiments, the at least one hydrophobic additive is selected from the group consisting of hydrophobic copolymer dispersants and salts thereof, nonionic rheology modifiers, PTFE powders, silicone surface additive, high molecular weight polyolefin powder, polyolefin wax and hydrophobic wax dispersions.

In some embodiments, a content of the at least one acrylic latex resin is 20-70 weight percent based on a total weight of the first part, comprising the coating material. In some embodiments, a content of the at least one functional filler is 25-65 weight percent based on a total weight of the first part, comprising the coating material. In some embodiments, a content of the at least one hydrophobic additive is 0.5-20 weight percent based on a total weight of the first part, comprising the coating material.

In some embodiments, the roofing formulation may further comprise a pigment. In some embodiments, a content of the pigment is 2-15 weight percent based on a total weight of the first part, comprising the coating material.

In some embodiments, the roofing formulation may further comprise a crosslinking agent.

In some embodiments, the coating material has a wet tensile strength of at least 80 psi as measured according to ASTM D882 and/or ASTM D2370.

In some embodiments, the first part, comprising the coating material, has a viscosity of from 50 to 40,000 cP measured using a Brookfield RV viscometer with spindle #3 at 2 rpm at 20° C. In some embodiments, the second part, comprising the activator formulation, comprises at least one flocculant, at least one desiccant, or any combination thereof.

In some embodiments, a roofing formulation may comprise a first part comprising a coating material, the coating material comprising: an acrylic latex resin, wherein the acrylic latex resin is selected from the group consisting of hydrophobic resins, self-crosslinking resins, and crosslinkable resins; a functional filler; and a hydrophobic additive; and a second part, wherein the second part comprises an activator formulation; wherein, when the roofing formulation is applied as a coating to a roofing substrate, the coating has a wet tensile strength of 80 psi to 500 psi as measured according to ASTM D882 and/or ASTM D2370.

In some embodiments, the functional filler is selected from the group consisting of silicate minerals, wollastonite, talc, mica, kaolin, feldspar, nepheline syenite, nanoclays, platy fillers, nano-oxide materials, calcium carbonate, aluminum oxide, magnesium hydroxide, basalt, zinc oxide, and combinations thereof.

In some embodiments, the hydrophobic additive is selected from the group consisting of hydrophobic copolymer dispersants and salts thereof, nonionic rheology modifiers, PTFE powders, and silicone surface additive, high molecular weight polyolefin powder, polyolefin wax hydrophobic wax dispersions.

In some embodiments, a content of the acrylic latex resin is 25-55 weight percent based on a total weight of the first part, comprising the coating material. In some embodiments, a content of the functional filler is 35-50 weight percent based on a total weight of the first part, comprising the coating material. In some embodiments, a content of the hydrophobic additive is 1-20 weight percent based on a total weight of the first part, comprising the coating material.

In some embodiments, the roofing formulation may further comprise a pigment. In some embodiments, a content of the pigment is 3-15 weight percent based on a total weight of the first part, comprising the coating material.

In some embodiments, the roofing formulation may further comprise a crosslinking agent.

In some embodiments, the first part, comprising the coating material, exhibits a water infiltration depth of 120 microns or less after 4 hours at 60° C. and 95% relative humidity. In some embodiments, the coating exhibits a wet tensile strength as measured according to ASTM D882 and/or ASTM D2370 of 80 psi to 500 psi. In some embodiments, the coating exhibits a wet adhesion as measured according to ASTM D903 of 2 pli to 15 pli. In some embodiments, the first part, comprising the coating material, has a viscosity of from 50 to 40,000 cP measured using a Brookfield RV viscometer with spindle #3 at 2 rpm at 20° C.

In some embodiments, the second part, comprising the activator formulation, comprises at least one flocculant, at least one desiccant, or any combination thereof.

In some embodiments, a roofing formulation may comprise a first part comprising a coating material, the coating material comprising: at least one acrylic latex resin, wherein the at least one acrylic latex resin is selected from the group consisting of hydrophobic resins, self-crosslinking resins, and crosslinkable resins; at least one functional filler having an aspect ratio of 3 to 100; and at least one hydrophobic additive; and a second part, wherein the second part comprises an activator formulation; wherein, when the roofing formulation, is applied as a 500 micron dry film thickness coating to a roofing substrate, the coating exhibits a greater dry tensile strength than a test coating on a roofing substrate applied with an identical coating material without the at least one functional filler having said aspect ratio.

In some embodiments, a roofing system may comprise at least one roof substrate and a multi-layer coating system. In some embodiments, the multi-layer coating system comprises at least one top layer and at least one core layer disposed between the at least one top layer and the at least one roof substrate. In some embodiments, the at least one top layer comprises at least one hydrophobic additive. In some embodiments, the at least one hydrophobic additive comprises polyvinylidene fluoride (PVDF). In some embodiments, the at least one core layer comprises at least one acrylic latex resin. In some embodiments, the roofing system further comprises a scrim that is disposed between the at least one core layer of the multi-layer coating system and the at least one roof substrate. In some embodiments, the multi-layer coating system may be "self-stratified," as described further below.

BRIEF DESCRIPTION OF THE DRAWING

FIG. 1 depicts an elemental map of a non-limiting example of a self-stratified, multi-layer coating system present on at least one roof substrate, according to some non-limiting embodiments of the present disclosure.

DETAILED DESCRIPTION

Described herein are water-resistant waterborne acrylic coating materials, systems and methods providing enhanced water resistance and durability. Such coatings extend the service life of roofing systems that are exposed to ponding water and other extreme weather conditions. Coatings described herein exhibit superior water resistance attributes including one or more of water infiltration resistance, wet tensile strength and wet adhesion. Resultant coatings are resistant to ponding water failures upon long-term exposure to standing water environment, wet-dry cycling and other thermal cycle stresses.

The coating materials provided herein generally comprise at least one acrylic latex resin, at least one functional filler, and at least one hydrophobic additive. The inventors have found that such materials exhibit superior water resistance properties, including preventing water infiltration while providing high wet tensile strength and wet adhesion, thus providing durable roofing systems even under ponding conditions when applied to roofing substrates.

The acrylic latex resins used in embodiments described herein include hydrophobic resins, self-crosslinking resins, and/or crosslinkable resins. Examples of commercially-available self-crosslinking acrylics include Acronal® (BASF SE European Company) 4848, Ecronova® (Mallard Creek Polymers, Inc.) series such as grade 6608, Centurion® (The Dow Chemical Company), and UCAR™ (Arkema Inc.) Latex 9176. Examples of crosslinkable acrylics include Acrylics Rovene® (Mallard Creek Polymers, Inc.) 6119, acrylic resin grades with carboxylic acid end groups and an acid number (e.g. >8 mg/100 g), and Asahi Polydurex B3120 acrylic-silane core-shell hybrid. Examples of hydrophobic resins include Syntran® (Interpolymer Corporation) 6211, Rovene® (Mallard Creek Polymers, Inc.) 6120, and Neocar® (Arkema Inc.) 820, 2300, 850. Where crosslinkable resins are used, embodiments may optionally include one or more known chemical crosslinking agents such as carbodiimide such as Carbodilite® (Nisshinbo Holdings Inc.) and water stable epoxy silane such as Coatosil® (Momentive Performance Materials Inc.) 2287.

The functional fillers used in embodiments described herein provide enhanced properties such as tensile, water resistance and adhesion properties. Examples of such fillers include silicate minerals, silica, wollastonite, talc, mica, kaolin, feldspar, and nepheline syenite, surface treated fillers and sub-micron fillers such as nanoclays, platy fillers and nano-oxides (e.g., nano-oxide materials) commonly used in anti-corrosion coatings. Further examples of such fillers include aluminum hydroxide, aluminum oxide, magnesium hydroxide, barium sulfate, basalt, and zinc oxide. Without wishing to be bound by theory, the inventors believe that the incorporation of the nano-fillers creates a tortuous pathway for water permeation, limiting water absorption and adverse solvation effect on the coating. Examples of surface treated fillers include calcium carbonates, Camel-Wite™ ST (Imerys), aluminum trihydrates (low solubility) such as Hymod® (J.M. Huber Corporation) Micral grades, and Hymod M9400 SG & Hymod SB432-SG- surface treated grade. Other functional fillers are hydrophobic in nature and include Novakup® and Novacite® (Malvern Minerals Company) platy silica, treated and non-treated fumed silicas, Aerosil® (Evonik Degussa GmbH), Oxylink™ (Micronisers Australasia Pty Ltd.), pre-dispersed nano $ZnO_2$, and nano-kaolin, -bentonite, and -monomonilorite clays.

The hydrophobic additives used in embodiments described herein include Tamol® (Rohm and Haas Company) 165A, 731, 2011 and 2001, Disperbyk® (BYK-Chemie GMBH Ltd) 2013, 2015, and 099 and HUER thickeners (Nonionic Polyurethane Associative Thickeners) such as Acrysol® (Rohn and Haas Company) Rm-12w, 8W, 2020, and 995, and Dow Rheolate series, RM-12w, RM-995, RM-8W, and RM-2020NPR, PTFE micro powders for added hydrophobicity, SST®-3 (Shamrock Technologies, Inc.) micro PTFE, hydrophobic wax dispersions, and Ultralube® (Keim-Additec Surface GmbH) E-360 Modified paraffin.

In some embodiments, the hydrophobic additive may comprise polyvinylidene fluoride (PVDF). In some embodiments, the hydrophobic additive may comprise at least one of hydrophobic copolymer dispersants and salts thereof, nonionic rheology modifiers, PTFE powders, silicone surface additive, high molecular weight polyolefin powder, polyolefin wax, or hydrophobic wax dispersions, such as polyolefin wax hydrophobic wax dispersions.

In certain embodiments, the content of the at least one acrylic latex resin within the coating material is about 20-70 weight percent. In other embodiments, the content of the at least one acrylic latex resin within the coating material is about 30-70 weight percent. In other embodiments, the content of the at least one acrylic latex resin within the coating material is about 40-70 weight percent. In other embodiments, the content of the at least one acrylic latex resin within the coating material is about 50-70 weight percent. In other embodiments, the content of the at least one acrylic latex resin within the coating material is about 20-60 weight percent. In other embodiments, the content of the at least one acrylic latex resin within the coating material is about 20-50 weight percent. In other embodiments, the content of the at least one acrylic latex resin within the coating material is about 20-40 weight percent. In other embodiments, the content of the at least one acrylic latex resin within the coating material is about 20-30 weight percent. In other embodiments, the content of the at least one acrylic latex resin within the coating material is about 25-65 weight percent. In other embodiments, the content of the at least one acrylic latex resin within the coating material is about 30-60 weight percent. In other embodiments, the content of the at least one acrylic latex resin within the coating material is about 25-55 weight percent. In other embodiments, the content of the at least one acrylic latex resin within the coating material is about 35-55 weight percent. In other embodiments, the content of the at least one acrylic latex resin within the coating material is about 35-50 weight percent. In some embodiments, the content of the at least one acrylic latex resin within the coating material is a weight percent based on a total weight of the first part, comprising the coating material.

In certain embodiments, the content of at least one functional filler within the coating material is about 10-50 weight percent. In other embodiments, the content of at least one functional filler within the coating material is about 10-40 weight percent. In other embodiments, the content of at least one functional filler within the coating material is about 10-30 weight percent. In other embodiments, the content of at least one functional filler within the coating material is about 10-20 weight percent. In other embodiments, the content of at least one functional filler within the coating material is about 20-50 weight percent. In other embodiments, the content of at least one functional filler within the coating material is about 30-50 weight percent. In other embodiments, the content of at least one functional filler within the coating material is about 40-50 weight percent. In other embodiments, the content of at least one functional filler within the coating material is about 15-45 weight percent. In other embodiments, the content of at least one functional filler within the coating material is about 20-45 weight percent. In other embodiments, the content of at least one functional filler within the coating material is about 25-45 weight percent. In other embodiments, the content of at least one functional filler within the coating material is about 30-45 weight percent. In other embodiments, the content of at least one functional filler within the coating material is about 35-40 weight percent. In some embodiments, the content of the at least one functional filler within the coating material is a weight percent based on a total weight of the first part, comprising the coating material.

In certain embodiments, the content of at least one hydrophobic additive is about 0.5-20 weight percent. In other embodiments, the content of at least one hydrophobic additive is about 1-20 weight percent. In other embodiments, the content of at least one hydrophobic additive is about 0.5-10 weight percent. In other embodiments, the content of at least one hydrophobic additive is about 1-5 weight percent. In other embodiments, the content of at least one hydrophobic additive is about 1-3 weight percent. In other embodiments, the content of at least one hydrophobic additive is about 1-2 weight percent. In some embodiments, the content of the at least one hydrophobic additive is a weight percent based on a total weight of the first part, comprising the coating material.

The coating materials provided herein optionally comprise pigment materials such as titanium dioxide particles. In certain of these embodiments, the content of the pigment is 2-15 weight percent. In other embodiments, the content of the pigment is 3-15 weight percent. In other embodiments, the content of the pigment is 4-15 weight percent. In other embodiments, the content of the pigment is 5-15 weight percent. In other embodiments, the content of the pigment is 6-15 weight percent. In other embodiments, the content of the pigment is 7-15 weight percent. In other embodiments, the content of the pigment is 8-15 weight percent. In other embodiments, the content of the pigment is 9-15 weight percent. In other embodiments, the content of the pigment is 10-15 weight percent. In other embodiments, the content of the pigment is 11-15 weight percent. In other embodiments, the content of the pigment is 12-15 weight percent. In other embodiments, the content of the pigment is 13-15 weight percent. In other embodiments, the content of the pigment is 14-15 weight percent. In other embodiments, the content of the pigment is 2-14 weight percent. In other embodiments, the content of the pigment is 2-13 weight percent. In other embodiments, the content of the pigment is 2-12 weight percent. In other embodiments, the content of the pigment is 2-11 weight percent. In other embodiments, the content of the pigment is 2-10 weight percent. In other embodiments, the content of the pigment is 2-9 weight percent. In other embodiments, the content of the pigment is 2-8 weight percent. In other embodiments, the content of the pigment is 2-7 weight percent. In other embodiments, the content of the pigment is 2-6 weight percent. In other embodiments, the content of the pigment is 2-5 weight percent. In other embodiments, the content of the pigment is 2-4 weight percent. In other embodiments, the content of the pigment is 2-3 weight percent. In some embodiments, the content of the pigment is a weight percent based on a total weight of the first part, comprising the coating material.

In some embodiments, the at least one functional filler has an aspect ratio of 3 to 100. In some embodiments, the at least one functional filler has an aspect ratio of 5 to 100. In some embodiments, the at least one functional filler has an aspect ratio of 10 to 100. In some embodiments, the at least one functional filler has an aspect ratio of 15 to 100. In some embodiments, the at least one functional filler has an aspect ratio of 20 to 100. In some embodiments, the at least one functional filler has an aspect ratio of 25 to 100. In some embodiments, the at least one functional filler has an aspect ratio of 30 to 100. In some embodiments, the at least one functional filler has an aspect ratio of 35 to 100. In some embodiments, the at least one functional filler has an aspect ratio of 40 to 100. In some embodiments, the at least one functional filler has an aspect ratio of 45 to 100. In some embodiments, the at least one functional filler has an aspect ratio of 50 to 100. In some embodiments, the at least one functional filler has an aspect ratio of 55 to 100. In some embodiments, the at least one functional filler has an aspect ratio of 60 to 100. In some embodiments, the at least one functional filler has an aspect ratio of 65 to 100. In some embodiments, the at least one functional filler has an aspect ratio of 70 to 100. In some embodiments, the at least one functional filler has an aspect ratio of 75 to 100. In some embodiments, the at least one functional filler has an aspect ratio of 80 to 100. In some embodiments, the at least one functional filler has an aspect ratio of 85 to 100. In some embodiments, the at least one functional filler has an aspect ratio of 90 to 100. In some embodiments, the at least one functional filler has an aspect ratio of 95 to 100.

In some embodiments, the at least one functional filler has an aspect ratio of 3 to 95. In some embodiments, the at least one functional filler has an aspect ratio of 3 to 90. In some embodiments, the at least one functional filler has an aspect ratio of 3 to 85. In some embodiments, the at least one functional filler has an aspect ratio of 3 to 80. In some embodiments, the at least one functional filler has an aspect ratio of 3 to 75. In some embodiments, the at least one functional filler has an aspect ratio of 3 to 70. In some embodiments, the at least one functional filler has an aspect ratio of 3 to 65. In some embodiments, the at least one functional filler has an aspect ratio of 3 to 60. In some embodiments, the at least one functional filler has an aspect ratio of 3 to 55. In some embodiments, the at least one functional filler has an aspect ratio of 3 to 50. In some embodiments, the at least one functional filler has an aspect ratio of 3 to 45. In some embodiments, the at least one functional filler has an aspect ratio of 3 to 40. In some embodiments, the at least one functional filler has an aspect ratio of 3 to 35. In some embodiments, the at least one functional filler has an aspect ratio of 3 to 30. In some embodiments, the at least one functional filler has an aspect ratio of 3 to 25. In some embodiments, the at least one functional filler has an aspect ratio of 3 to 20. In some embodiments, the at least one functional filler has an aspect ratio of 3 to 15. In some embodiments, the at least one functional filler has an aspect ratio of 3 to 15. In some embodiments, the at least one functional filler has an aspect ratio of 3 to 10. In some embodiments, the at least one functional filler has an aspect ratio of 3 to 5.

In some embodiments, the coating material has a wet tensile strength of at least 80 psi as measured according to ASTM D882 and/or ASTM D2370.

Coatings made from the coating materials described herein provide excellent resistance against water infiltration. In some embodiments, when the coating material is applied as a coating to the roofing substrate, the coating exhibits a water infiltration depth after 4 hours at 60° C. and 95% relative humidity of about 120 microns or less in some embodiment, about 100 microns or less in other embodiments, about 75 microns or less in other embodiments, about 55 microns or less in other embodiments, and about 35 microns or less in other embodiments. When the coating material is applied as a coating to the roofing substrate, the coating exhibits a wet tensile strength as measured according to ASTM D882 and/or ASTM D2370 of at least 80 psi in some embodiments, at least 95 psi in other embodiments, and at least 105 psi in other embodiments, at least 120 psi in other embodiments, and at least 130 psi in other embodiments. When the coating material is applied as a coating to the roofing substrate, the coating exhibits a wet adhesion of at least about 2 pli (pounds per linear inch) as measured according to ASTM D903 in some embodiments. In embodiments, when the coating material is applied as a coating to the roofing substrate, the coating exhibits a wet adhesion of about 2 pli to about 15 pli as measured according to ASTM D903. In embodiments, when the coating material is applied as a coating to the roofing substrate, the coating exhibits a wet adhesion of about 3 pli to about 15 pli as measured according to ASTM D903. In embodiments, when the coating material is applied as a coating to the roofing substrate, the coating exhibits a wet adhesion of about 4 pli to about 15 pli as measured according to ASTM D903. In embodiments, when the coating material is applied as a coating to the roofing substrate, the coating exhibits a wet adhesion of about 5 pli to about 15 pli as measured according to ASTM D903. In embodiments, when the coating material is applied as a coating to the roofing substrate, the coating exhibits a wet adhesion of about 6 pli to about 15 pli as measured according to ASTM D903. In embodiments, when the coating material is applied as a coating to the roofing substrate, the coating exhibits a wet adhesion of about 7 pli to about 15 pli as measured according to ASTM D903. In embodiments, when the coating material is applied as a coating to the roofing substrate, the coating exhibits a wet adhesion of about 8 pli to about 15 pli as measured according to ASTM D903. In embodiments, when the coating material is applied as a coating to the roofing substrate, the coating exhibits a wet adhesion of about 9 pli to about 15 pli as measured according to ASTM D903. In embodiments, when the coating material is applied as a coating to the roofing substrate, the coating exhibits a wet adhesion of about 10 pli to about 15 pli as measured according to ASTM D903. In embodiments, when the coating material is applied as a coating to the roofing substrate, the coating exhibits a wet adhesion of about 11 pli to about 15 pli as measured according to ASTM D903. In embodiments, when the coating material is applied as a coating to the roofing substrate, the coating exhibits a wet adhesion of about 12 pli to about 15 pli as measured according to ASTM D903. In embodiments, when the coating material is applied as a coating to the roofing substrate, the coating exhibits a wet adhesion of about 13 pli to about 15 pli as measured according to ASTM D903. In embodiments, when the coating material is applied as a coating to the roofing substrate, the coating exhibits a wet adhesion of about 14 pli to about 15 pli as measured according to ASTM D903.

In some embodiments, the coating material is present in a roofing formulation. In some embodiments, the roofing formulation comprises a first part comprising the coating material and a second part, comprising an activator formulation. As used herein, an activator formulation is a formulation that upon mixing with a coating material in a sufficient amount, speeds up solidification of a coating material, relative to an otherwise equivalent coating material where no activator formulation is present.

In some embodiments, the activator formulation is present in an amount ranging from 0.5 wt % to 25 wt % based on a total solid weight of the roofing formulation. In some embodiments, the activator formulation is present in an amount ranging from 1.5 wt % to 25 wt % based on a total solid weight of the roofing formulation, from 2.5 wt % to 25 wt % based on a total solid weight of the roofing formulation, from 3.5 wt % to 25 wt % based on a total solid weight of the roofing formulation, from 4.5 wt % to 25 wt % based on a total solid weight of the roofing formulation, from 5.5 wt % to 25 wt % based on a total solid weight of the roofing formulation, from 6.5 wt % to 25 wt % based on a total solid weight of the roofing formulation, from 7.5 wt % to 25 wt % based on a total solid weight of the roofing formulation, from 8.5 wt % to 25 wt % based on a total solid weight of the roofing formulation, from 9.5 wt % to 25 wt % based on a total solid weight of the roofing formulation, from 10.5 wt % to 25 wt % based on a total solid weight of the roofing formulation, from 11.5 wt % to 25 wt % based on a total solid weight of the roofing formulation, from 12.5 wt % to 25 wt % based on a total solid weight of the roofing formulation, from 13.5 wt % to 25 wt % based on a total solid weight of the roofing formulation, from 14.5 wt % to 25 wt % based on a total solid weight of the roofing formulation, from 15.5 wt % to 25 wt % based on a total solid weight of the roofing formulation, from 16.5 wt % to 25 wt % based on a total solid weight of the roofing formulation, from 17.5 wt % to 25 wt % based on a total solid weight of the roofing formulation, from 18.5 wt % to 25 wt % based on a total solid weight of the roofing formulation, from 19.5 wt % to 25 wt % based on a total solid weight of the roofing formulation, from 20.5 wt % to 25 wt % based on a total solid weight of the roofing formulation, from 21.5 wt % to 25 wt % based on a total solid weight of the roofing formulation, from 22.5 wt % to 25 wt % based on a total solid weight of the roofing formulation, from 23.5 wt % to 25 wt % based on a total solid weight of the roofing formulation, or from 24.5 wt % to 25 wt % based on a total solid weight of the roofing formulation.

In some embodiments, the activator formulation is present in an amount ranging from 0.5 wt % to 24 wt % based on a total solid weight of the roofing formulation, from 0.5 wt % to 23 wt % based on a total solid weight of the roofing formulation, from 0.5 wt % to 22 wt % based on a total solid weight of the roofing formulation, from 0.5 wt % to 21 wt % based on a total solid weight of the roofing formulation, from 0.5 wt % to 20 wt % based on a total solid weight of the roofing formulation, from 0.5 wt % to 19 wt % based on a total solid weight of the roofing formulation, from 0.5 wt % to 18 wt % based on a total solid weight of the roofing formulation, from 0.5 wt % to 17 wt % based on a total solid weight of the roofing formulation, from 0.5 wt % to 16 wt % based on a total solid weight of the roofing formulation, from 0.5 wt % to 15 wt % based on a total solid weight of the roofing formulation, from 0.5 wt % to 14 wt % based on a total solid weight of the roofing formulation, from 0.5 wt % to 13 wt % based on a total solid weight of the roofing formulation, from 0.5 wt % to 12 wt % based on a total solid weight of the roofing formulation, from 0.5 wt % to 11 wt % based on a total solid weight of the roofing formulation, from 0.5 wt % to 10 wt % based on a total solid weight of the roofing formulation, from 0.5 wt % to 9 wt % based on a total solid weight of the roofing formulation, from 0.5 wt % to 8 wt % based on a total solid weight of the roofing formulation, from 0.5 wt % to 8 wt % based on a total solid weight of the roofing formulation, from 0.5 wt % to 7 wt % based on a total solid weight of the roofing formulation, from 0.5 wt % to 6 wt % based on a total solid weight of the roofing formulation, from 0.5 wt % to 5 wt % based on a total solid weight of the roofing formulation, from 0.5 wt % to 4 wt % based on a total solid weight of the roofing formulation, from 0.5 wt % to 3 wt % based on a total solid weight of the roofing formulation, from 0.5 wt % to 2 wt % based on a total solid weight of the roofing formulation, or from 0.5 wt % to 1 wt % based on a total solid weight of the roofing formulation.

In some embodiments, the activator formulation is present in an amount ranging from 1.5 wt % to 24 wt % based on a total solid weight of the roofing formulation, from 2.5 wt % to 23 wt % based on a total solid weight of the roofing formulation, from 3.5 wt % to 22 wt % based on a total solid weight of the roofing formulation, from 4.5 wt % to 21 wt % based on a total solid weight of the roofing formulation, from 5.5 wt % to 20 wt % based on a total solid weight of the roofing formulation, from 6.5 wt % to 19 wt % based on a total solid weight of the roofing formulation, from 7.5 wt % to 18 wt % based on a total solid weight of the roofing formulation, from 8.5 wt % to 17 wt % based on a total solid weight of the roofing formulation, from 9.5 wt % to 16 wt % based on a total solid weight of the roofing formulation, from 10.5 wt % to 15 wt % based on a total solid weight of the roofing formulation, from 11.5 wt % to 14 wt % based on a total solid weight of the roofing formulation, or from 12.5 wt % to 13 wt % based on a total solid weight of the roofing formulation.

In some embodiments, the first part of the roofing formulation and the second part of the formulation can be applied sequentially. In some embodiments, the first part of the formulation and the second part of the formulation can be applied simultaneously.

In some embodiments, an exemplary method may comprise applying at least one part of the roofing formulation to at least one roof substrate. In some embodiments, the at least one roof substrate comprises a plywood substrate, a glass substrate, a fiberglass substrate, (e.g., a fiberglass mat), a cellulosic substrate, an underlayment, a roofing membrane (e.g., a thermoplastic polyolefin (TPO) or polyvinyl chloride (PVC) membrane), a roof deck, a photovoltaic (PV) panel, a modified bitumen (MODBIT) substrate, a roll good, or any combination thereof. In some embodiments, the at least one roof substrate comprises a roof deck.

In some embodiments, the at least one roof substrate may comprise at least one steep slope roof substrate. As defined herein, a "steep slope roof substrate" is any roof substrate that is disposed on a roof having a pitch of Y/X, where Y and X are in a ratio of 4:12 to 12:12, where Y corresponds to the "rise" of the roof, and where X corresponds to the "run" of the roof. In some embodiments, Y and X are in a ratio of 5:12 to 12:12. In some embodiments, Y and X are in a ratio of 6:12 to 12:12. In some embodiments, Y and X are in a ratio of 7:12 to 12:12. In some embodiments, Y and X are in a ratio of 6:12 to 12:12. In some embodiments, Y and X are in a ratio of 8:12 to 12:12. In some embodiments, Y and X are in a ratio of 6:12 to 12:12. In some embodiments, Y and X are in a ratio of 9:12 to 12:12. In some embodiments, Y and X are in a ratio of 10:12 to 12:12. In some embodiments, Y and X are in a ratio of 11:12 to 12:12. In some embodiments, Y and X are in a ratio of 4:12 to 11:12. In some embodiments, Y and X are in a ratio of 4:12 to 10:12. In some embodiments, Y and X are in a ratio of 4:12 to 9:12. In some embodiments, Y and X are in a ratio of 4:12 to 8:12. In some embodiments, Y and X are in a ratio of 4:12 to 7:12. In some embodiments, Y and X are in a ratio of 4:12 to 6:12. In some embodiments, Y and X are in a ratio of 4:12 to 5:12. In some embodiments, Y and X are in a ratio of 5:12 to 11:12. In some embodiments, Y and X are in a ratio of 6:12 to 10:12. In some embodiments, Y and X are in a ratio of 7:12 to 9:12.

In some embodiments, the first part of the roofing formulation, comprising the coating material, and the second part of the roofing formulation, comprising the activator formulation, are premixed prior to application (e.g., application of the roofing formulation on at least one roof substrate). In some embodiments, the first part of the roofing formulation, comprising the coating material, and the second part of the roofing formulation, comprising the activator formulation, are mixed by impingement, outside of at least one mixing device (e.g., an applicator device, such as but, not limited to a spraying device), prior to application. In some embodiments, the first part of the roofing formulation, comprising the coating material, and the second part of the roofing formulation, comprising the activator formulation, mixed during application (e.g., during application of the roofing formulation on at least one roof substrate). In some embodiments where the first part of the roofing formulation and the second part of the roofing formulation are mixed during application, the first part of the roofing formulation and the second part of the roofing formulation may be mixed inside of at least one mixing device (e.g., an applicator device, such as but, not limited to a spraying device).

In some embodiments, the first part, comprising the coating material, has a viscosity of from 50 to 40,000 cP measured using a Brookfield RV viscometer with spindle #3 at 2 rpm at 20° C. In some embodiments, the first part, comprising the coating material, has a viscosity of from 100 to 40,000 cP measured using a Brookfield RV viscometer with spindle #3 at 2 rpm at 20° C. In some embodiments, the first part, comprising the coating material, has a viscosity of from 1000 to 40,000 cP measured using a Brookfield RV viscometer with spindle #3 at 2 rpm at 20° C. In some embodiments, the first part, comprising the coating material, has a viscosity of from 5000 to 40,000 cP measured using a Brookfield RV viscometer with spindle #3 at 2 rpm at 20° C. In some embodiments, the first part, comprising the coating material, has a viscosity of from 10,000 to 40,000 cP measured using a Brookfield RV viscometer with spindle #3 at 2 rpm at 20° C. In some embodiments, the first part, comprising the coating material, has a viscosity of from 20,000 to 40,000 cP measured using a Brookfield RV viscometer with spindle #3 at 2 rpm at 20° C. In some embodiments, the first part, comprising the coating material, has a viscosity of from 30,000 to 40,000 cP measured using a Brookfield RV viscometer with spindle #3 at 2 rpm at 20° C. In some embodiments, the first part, comprising the coating material, has a viscosity of from 50 to 30,000 cP measured using a Brookfield RV viscometer with spindle #3 at 2 rpm at 20° C. In some embodiments, the first part, comprising the coating material, has a viscosity of from 50 to 20,000 cP measured using a Brookfield RV viscometer with spindle #3 at 2 rpm at 20° C. In some embodiments, the first part, comprising the coating material, has a viscosity of from 50 to 10,000 cP measured using a Brookfield RV viscometer with spindle #3 at 2 rpm at 20° C. In some embodiments, the first part, comprising the coating material, has a viscosity of from 50 to 5000 cP measured using a Brookfield RV viscometer with spindle #3 at 2 rpm at 20° C. In some embodiments, the first part, comprising the coating material, has a viscosity of from 50 to 1000 cP measured using a Brookfield RV viscometer with spindle #3 at 2 rpm at 20° C. In some embodiments, the first part, comprising the coating material, has a viscosity of from 50 to 100 cP measured using a Brookfield RV viscometer with spindle #3 at 2 rpm at 20° C. In some embodiments, the first part, comprising the coating material, has a viscosity of from 100 to 30,000 cP measured using a Brookfield RV viscometer with spindle #3 at 2 rpm at 20° C. In some embodiments, the first part, comprising the coating material, has a viscosity of from 500 to 20,000 cP measured using a Brookfield RV viscometer with spindle #3 at 2 rpm at 20° C. In some embodiments, the first part, comprising the coating material, has a viscosity of from 1000 to 10,000 cP measured using a Brookfield RV viscometer with spindle #3 at 2 rpm at 20° C.

In some embodiments, the pigment is present in an amount ranging from 0.05 wt % to 2 wt % based on a total weight of the first part of the roofing formulation comprising the coating material. In some embodiments, the pigment is present in an amount ranging from 0.1 wt % to 2 wt % based on a total weight of the first part of the roofing formulation comprising the coating material. In some embodiments, the pigment is present in an amount ranging from 0.5 wt % to 2 wt % based on a total weight of the first part of the roofing formulation comprising the coating material. In some embodiments, the pigment is present in an amount ranging from 1 wt % to 2 wt % based on a total weight of the first part of the roofing formulation comprising the coating material. In some embodiments, the pigment is present in an amount ranging from 0.05 wt % to 1 wt % based on a total weight of the first part of the roofing formulation comprising the coating material. In some embodiments, the pigment is present in an amount ranging from 0.05 wt % to 0.5 wt % based on a total weight of the first part of the roofing formulation comprising the coating material. In some embodiments, the pigment is present in an amount ranging from 0.05 wt % to 0.1 wt % based on a total weight of the first part of the roofing formulation comprising the coating material. In some embodiments, the pigment is present in an amount ranging from 0.1 wt % to 1 wt % based on a total weight of the first part of the roofing formulation comprising the coating material.

In some embodiments, the second part of the roofing formulation, comprising the activator formulation, comprises at least one flocculant, at least one desiccant, or any combination thereof. In some embodiments, the at least one flocculant may comprise at least one charged polymer, at least one multivalent metal salt (such as, but not limited to, aluminum sulfate), or any combination thereof. In some embodiments, the at least one desiccant may comprise at least one calcium oxide, Portland cement, calcium silicate hydrate, or any combination thereof.

In some embodiments, a weight ratio of the at least one flocculant to the at least one acrylic latex resin is from 0.1:16 to 5:16. In some embodiments, a weight ratio of the at least one flocculant to the at least one acrylic latex resin is from 0.5:16 to 5:16. In some embodiments, a weight ratio of the at least one flocculant to the at least one acrylic latex resin is from 1:16 to 5:16. In some embodiments, a weight ratio of the at least one flocculant to the at least one acrylic latex resin is from 2:16 to 5:16. In some embodiments, a weight ratio of the at least one flocculant to the at least one acrylic latex resin is from 3:16 to 5:16. In some embodiments, a weight ratio of the at least one flocculant to the at least one acrylic latex resin is from 4:16 to 5:16. In some embodiments, a weight ratio of the at least one flocculant to the at least one acrylic latex resin is from 0.1:16 to 4:16. In some embodiments, a weight ratio of the at least one flocculant to the at least one acrylic latex resin is from 0.1:16 to 3:16. In some embodiments, a weight ratio of the at least one flocculant to the at least one acrylic latex resin is from 0.1:16 to 2:16. In some embodiments, a weight ratio of the at least one flocculant to the at least one acrylic latex resin is from 0.1:16 to 1:16. In some embodiments, a weight ratio of the at least one flocculant to the at least one acrylic latex resin is from 0.1:16 to 0.5:16. In some embodiments, a weight ratio of the at least one flocculant to the at least one acrylic latex resin is from 0.5:16 to 4:16. In some embodiments, a weight ratio of the at least one flocculant to the at least one acrylic latex resin is from 0.5:16 to 3:16. In some embodiments, a weight ratio of the at least one flocculant to the at least one acrylic latex resin is from 1:16 to 2:16.

In some embodiments, the roofing formulation may be at least one liquid applied roofing formulation. As used herein, a "liquid applied roofing formulation" is any formulation that can be applied to a steep slope roof substrate in liquid form, such as but not limited to by spraying, coating, painting, or any combination thereof. A "liquid applied roofing formulation" includes, but is not limited to, any liquid applied roof coating described in US Patent Application Publication No. 20200224409, titled "Liquid Applied Roofing System with Improved Moisture Barrier Layer," the entirety of which is incorporated herein by reference for all purposes. In some embodiments, "liquid applied roofing formulation" has a viscosity range specified herein. In some embodiments, the liquid applied roofing formulation may be applied onto a membrane. In some embodiments, the liquid applied roofing formulation may be applied onto a fabric, such as, but not limited to a scrim. In some embodiments, applying the liquid applied roofing formulation onto the fabric, such as the scrim, may provide enhanced durability, enhanced mechanical performance, or any combination thereof.

In some embodiments, application of the roofing formulation on at least one roof substrate (e.g., at least one steep slope roof substrate) forms at least one coating layer on the at least one roof substrate. In some embodiments, application of the first part of the roofing formulation on at least one roof substrate (e.g., at least one steep slope roof substrate) forms at least one coating layer on the at least one roof substrate. In some embodiments, application of the first part of the roofing formulation and the second part of the roofing formulation on at least one roof substrate (e.g., at least one steep slope roof substrate) forms at least one coating layer on the at least one roof substrate. In some embodiments, application of the roofing formulation on at least one roofing substrate forms a 500 micron dry film thickness coating.

In some embodiments, the at least one coating layer, as applied to the at least one roof substrate, exhibits a water infiltration depth of 120 microns or less. In some embodiments, the at least one coating layer, as applied to the at least one roof substrate, exhibits a water infiltration depth of 60 microns or less. In some embodiments, the at least one coating layer, as applied to the at least one roof substrate, exhibits a water infiltration depth of 30 microns or less. In some embodiments, the at least one coating layer, as applied to the at least one roof substrate, exhibits a water infiltration depth of 15 microns or less. In some embodiments, the at least one coating layer, as applied to the at least one roof substrate, exhibits a water infiltration depth of 10 microns or less. In some embodiments, the at least one coating layer, as applied to the at least one roof substrate, exhibits a water infiltration depth of 5 microns or less. In some embodiments, the at least one coating layer, as applied to the at least one roof substrate, exhibits a water infiltration depth of 1 micron or less. In some embodiments, the at least one coating layer, as applied to the at least one roof substrate, exhibits a water infiltration depth of 1 to 120 microns. In some embodiments, the at least one coating layer, as applied to the at least one roof substrate, exhibits a water infiltration depth of 5 to 120 microns. In some embodiments, the at least one coating layer, as applied to the at least one roof substrate, exhibits a water infiltration depth of 10 to 120 microns. In some embodiments, the at least one coating layer, as applied to the at least one roof substrate, exhibits a water infiltration depth of 15 to 120 microns. In some embodiments, the at least one coating layer, as applied to the at least one roof substrate, exhibits a water infiltration depth of 30 to 120 microns. In some embodiments, the at least one coating layer, as applied to the at least one roof substrate, exhibits a water infiltration depth of 60 to 120 microns. In some embodiments, the at least one coating layer, as applied to the at least one roof substrate, exhibits a water infiltration depth of 1 to 60 microns. In some embodiments, the at least one coating layer, as applied to the at least one roof substrate, exhibits a water infiltration depth of 1 to 30 microns. In some embodiments, the at least one coating layer, as applied to the at least one roof substrate, exhibits a water infiltration depth of 1 to 15 microns. In some embodiments, the at least one coating layer, as applied to the at least one roof substrate, exhibits a water infiltration depth of 1 to 10 microns. In some embodiments, the at least one coating layer, as applied to the at least one roof substrate, exhibits a water infiltration depth of 1 to 5 microns. In some embodiments, the at least one coating layer, as applied to the at least one roof substrate, exhibits a water infiltration depth of 5 to 60 microns. In some embodiments, the at least one coating layer, as applied to the at least one roof substrate, exhibits a water infiltration depth of 10 to 30 microns. In some embodiments, the coating exhibits at least one of the water infiltration depths herein after 4 hours at 60° C. and 95% relative humidity.

In some embodiments, the at least one coating layer, as applied to the at least one roof substrate, has a wet tensile strength of 80 psi to 500 psi. In some embodiments, the at least one coating layer, as applied to the at least one roof substrate, has a wet tensile strength of 100 psi to 500 psi. In some embodiments, the at least one coating layer, as applied to the at least one roof substrate, has a wet tensile strength of 150 psi to 500 psi. In some embodiments, the at least one coating layer, as applied to the at least one roof substrate, has a wet tensile strength of 200 psi to 500 psi. In some embodiments, the at least one coating layer, as applied to the at least one roof substrate, has a wet tensile strength of 250 psi to 500 psi. In some embodiments, the at least one coating layer, as applied to the at least one roof substrate, has a wet tensile strength of 300 psi to 500 psi. In some embodiments, the at least one coating layer, as applied to the at least one roof substrate, has a wet tensile strength of 350 psi to 500 psi. In some embodiments, the at least one coating layer, as applied to the at least one roof substrate, has a wet tensile strength of 400 psi to 500 psi. In some embodiments, the at least one coating layer, as applied to the at least one roof substrate, has a wet tensile strength of 450 psi to 500 psi. In some embodiments, the at least one coating layer, as applied to the at least one roof substrate, has a wet tensile strength of 80 psi to 450 psi. In some embodiments, the at least one coating layer, as applied to the at least one roof substrate, has a wet tensile strength of 80 psi to 400 psi. In some embodiments, the at least one coating layer, as applied to the at least one roof substrate, has a wet tensile strength of 80 psi to 350 psi. In some embodiments, the at least one coating layer, as applied to the at least one roof substrate, has a wet tensile strength of 80 psi to 300 psi. In some embodiments, the at least one coating layer, as applied to the at least one roof substrate, has a wet tensile strength of 80 psi to 250 psi. In some embodiments, the at least one coating layer, as applied to the at least one roof substrate, has a wet tensile strength of 80 psi to 200 psi. In some embodiments, the at least one coating layer, as applied to the at least one roof substrate, has a wet tensile strength of 80 psi to 150 psi. In some embodiments, the at least one coating layer, as applied to the at least one roof substrate, has a wet tensile strength of 80 psi to 100 psi. In some embodiments, the at least one coating layer exhibits at least one of the wet tensile strengths herein as measured according to at least one of ASTM D882 or ASTM D2370.

In some embodiments, the at least one coating layer, as applied to the at least one roof substrate, exhibits a greater dry tensile strength than a test coating on a roofing substrate applied with an identical coating material without the at least one functional filler having the aspect ratio.

In some embodiments, application of the roofing formulation on at least one roof substrate forms a multi-layer coating system on the at least one roof substrate. In some embodiments, application of the first part of the roofing formulation on at least one roof substrate forms a multi-layer coating system on the at least one roof substrate. In some embodiments, application of the first part of the roofing formulation and the second part of the roofing formulation on at least one roof substrate forms a multi-layer coating system on the at least one roof substrate. In some embodiments, the multi-layer coating system comprises at least one top layer and at least one core layer. In some embodiments, the at least one core layer is disposed between the at least one top layer and the at least one roof substrate.

In some embodiments, the at least one top layer is at least one hydrophobic top layer. In some embodiments, the hydrophobic top layer may comprise the at least one hydrophobic additive described herein, which in some non-limiting embodiments, may comprise PVDF. In some embodiments, the at least one hydrophobic top layer provides protection against water infiltration into the at least one core layer.

In some embodiments, the at least one hydrophobic top layer may have a surface energy of less than 20 mN/m. In some embodiments, the at least one hydrophobic top layer may have a surface energy of less than 15 mN/m. In some embodiments, the at least one hydrophobic top layer may have a surface energy of less than 10 mN/m. In some embodiments, the at least one hydrophobic top layer may have a surface energy of less than 5 mN/m. In some embodiments, the at least one hydrophobic top layer may have a surface energy of less than 1 mN/m. In some embodiments, the at least one hydrophobic top layer may have a surface energy of 1 mN/m to 20 mN/m. In some embodiments, the at least one hydrophobic top layer may have a surface energy of 5 mN/m to 20 mN/m. In some embodiments, the at least one hydrophobic top layer may have a surface energy of 10 mN/m to 20 mN/m. In some embodiments, the at least one hydrophobic top layer may have a surface energy of 15 mN/m to 20 mN/m. In some embodiments, the at least one hydrophobic top layer may have a surface energy of 1 mN/m to 15 mN/m. In some embodiments, the at least one hydrophobic top layer may have a surface energy of 1 mN/m to 10 mN/m. In some embodiments, the at least one hydrophobic top layer may have a surface energy of 1 mN/m to 5 mN/m. In some embodiments, the at least one hydrophobic top layer may have a surface energy of 5 mN/m to 15 mN/m.

In some embodiments, the at least one core layer is at least one acrylic core layer. In some embodiments, the at least one acrylic core layer may comprise the at least one acrylic latex resin described herein. In some embodiments, the at least one acrylic core layer may comply with the ASTM D6083 standard for acrylic coatings in roofing applications. In some embodiments, the at least one acrylic core layer may provide mechanical and adhesive properties to the at least one substrate.

In some embodiments, the at least one acrylic core layer may have a surface energy of at least 20 mN/m. In some embodiments, the at least one acrylic core layer may have a surface energy of at least 25 mN/m. In some embodiments, the at least one acrylic core layer may have a surface energy of at least 30 mN/m. In some embodiments, the at least one acrylic core layer may have a surface energy of at least 45 mN/m. In some embodiments, the at least one acrylic core layer may have a surface energy of at least 50 mN/m. In some embodiments, the at least one acrylic core layer may have a surface energy of 20 mN/m to 50 mN/m. In some embodiments, the at least one acrylic core layer may have a surface energy of 25 mN/m to 50 mN/m. In some embodiments, the at least one acrylic core layer may have a surface energy of 30 mN/m to 50 mN/m. In some embodiments, the at least one acrylic core layer may have a surface energy of 45 mN/m to 50 mN/m. In some embodiments, the at least one acrylic core layer may have a surface energy of 20 mN/m to 45 mN/m. In some embodiments, the at least one acrylic core layer may have a surface energy of 20 mN/m to 30 mN/m. In some embodiments, the at least one acrylic core layer may have a surface energy of 20 mN/m to 25 mN/m. In some embodiments, the at least one acrylic core layer may have a surface energy of 25 mN/m to 30 mN/m.

In some embodiments, the multi-layer coating system may be "self-stratified." As used herein, a "self-stratified" multi-layer coating system is a coating system that spontaneously segregates into at least two layers after application (e.g., as a roofing formulation) on at least one roof substrate. In some non-limiting embodiments, the first layer and the second layer may comprise different concentrations of components present in the roofing formulation. In some embodiments, such spontaneous segregation may occur due to: a difference in relative surface energies between components of the multi-layer coating system, a difference in relative water contact angles between components of the multi-layer coating system, or any combination thereof. For instance, in some non-limiting embodiments, a first component of the multi-layer coating system, having a lower surface energy, may segregate to form the at least one top layer, whereas a second component of the multi-layer coating system having a higher surface energy (i.e., relative to the first component) may segregate to form the at least one core layer. In some non-limiting embodiments, the first component having the lower surface energy may be the at least one hydrophobic additive (such as, but not limited to, PVDF). In some embodiments, the second component having the higher surface energy may be the at least one acrylic latex resin.

EXAMPLES

Example 1

Embodiments of the invention are described with reference to the following non-limiting examples. Samples 1-12 were formulated and tested for various mechanical properties as described herein.

Coating formulations were prepared as follows. The grind stage was prepared by adding the water, dispersing agent and wetting agent together and combining. The fillers were then added in stages with short 30 second cycles at 1200 rpm in a counter-rotating planetary speed mixer. The pigment (TiO$_2$) and pigment extender were added together and mixed. The calcium carbonate was then added in two stages. Finally, the defoamer and any thickener were added with light stirring and speed mixed for 45 seconds. Once checked for homogeneity, the grind stage was mixed at 1600 rpm for 3 minutes to ensure full dispersion. The letdown stage was performed in a standard high-speed disperser with a Cowles style blade, and each addition was done in rank order shown to incorporate fully before the next addition. Alternatively, similar results were attained by thoroughly hand-stirring each additive into the batch with a spatula and performing a final speed mix of 1 minute at 1200 rpm. Batches were allowed to sit overnight at ambient temperatures in their sealed containers. All batches were speed mixed at 1200 rpm for 1 minute under 26 in Hg of vacuum to de-air the coating before films were drawn down.

Wet tensile testing was performed according to ASTM D882 and/or ASTM D2370 after 24 hours at 72°F immersion in water. All samples were cut using a six cell die of sample dimensions 0.5"×3". Samples were handled and measured while wet, and blotted dry just before testing.

Water infiltration testing was performed on 2" diameter samples of a 500 micron dry film thickness (dft) coating film placed on a 2" outer diameter Quick-Clamp Sanitary Tube Fitting placed on top of a metal mesh set in a sample tray to allow for air flow to bottom of membrane. About 20 ml of 1% Methylene Blue solution was pipetted into the top section of the fitting. Each sample on its tray was then placed into a stability chamber set to 60° C. at 95% relative humidity for 4 hours. The sample jig was then drained of dye solution, blotted dry and the samples were removed and allowed to cool and dry. Each sample was cut evenly in half with a clean sharp razor blade. Samples were mounted into a micro vise edge up and cross sections were viewed at 200× magnification. The total film thickness and average depth of dye penetration were measured optically and recorded.

For wet adhesion testing, samples were prepared by creating a total of 500 micron dry film thickness (dft) film with an embedment of a reinforcement in size, 5 inches wide and 11 inches long. Samples were drawn down on a 6 inch-by-6 inch sample of 45 mil TPO with TPO Red Primer (GAF Materials Corporation). Silicone caulk was used to seal all edges to prevent lateral water infiltration. The cured samples were placed in pans filled with 1-1.5 inches of deionized water and allowed to rest either at room temperature or at 60° C. for 7 days. The water in the pan was then drained and the samples were tested as per ASTM D903.

Table I provides compositional information for Samples 1-12, and Table II provides test results.

TABLE I

Sample compositions (in weight percent).

| Sample # | Resin | Filler | Hydrophobic Additive | Pigment | Other |
|---|---|---|---|---|---|
| 1 (comparative) | 42% (Acronal 4848) | 36.5% (CaCO$_3$) | None | 6.1% (TiO$_2$) | 10.2% water, 0.57% propylene glycol, 0.46% AntiTerra 250, 0.12% potassium tri-polyphosphate, other inactive ingredients to balance |
| 7 (comparative) | 41.7% (Acronal NX3250M) | 35.9% (CaCO$_3$ + SB-432) | 1.36% (Tamol 901A + Rheolate 1) | 6.1% (TiO$_2$) | 12.2% water, other inactive ingredients to balance |
| 9 (comparative) | 43.6% Rovene 6120 | 36.5% CaCO$_3$ | 0.65% Tamol 165A + Acrysol RM-8W | 6.7% (TiO$_2$) | 10.4% water, other inactive ingredients to balance (other may include surfactants, rheological modifiers, pH modifiers, defoamers) |
| 11 (comparative) | 43.4% Rovene 6120 | 36.5% ATH | 0.95% Tamol 165A + Acrysol RM-8W | 6.7% (TiO$_2$) | 10.2% water, other inactive ingredients to balance |
| 2 | 42% (Acronal 4848) | 36.5% (CaCO$_3$) | 1.45% (Tamol 165A + Acrysol RM-8W) | 6.8% (TiO$_2$) | 10.3% water, 0.57% propylene glycol, other inactive ingredients to balance |
| 3 | 35.6% (Acronal 4848) | 36.4% (CaCO$_3$) | 8.22% (Tamol 165A + Acrysol RM-8W + APS-254) | 6.7% (TiO$_2$) | 10.0% water, 0.55% propylene glycol, other inactive ingredients to balance |
| 4 | 41.4% (Syntran 6211) | 36.5% (CaCO$_3$) | 1.25% (Tamol 165A + Acrysol RM-8W) | 6.8% (TiO$_2$) | 10.5% water, 0.55% propylene glycol, other inactive ingredients to balance |
| 5 | 42.3% (Syntran 6211) | 36.4% Camel Wite ST | 0.97% (Tamol 165A + Acrysol RM-8W) | 6.7% (TiO$_2$) | 9.97% water, 0.55% propylene glycol, other inactive ingredients to balance |

TABLE I-continued

Sample compositions (in weight percent).

| Sample # | Resin | Filler | Hydrophobic Additive | Pigment | Other |
|---|---|---|---|---|---|
| 6 | 27.3% (Syntran 6211) | 36.5% (CaCO$_3$) | 15.9% (Tamol 165A + Acrysol RM-8W + Carapol AAR-127) | 6.7% (TiO$_2$) | 10.0% water, 0.55% propylene glycol, other inactive ingredients to balance |
| 8 | 42% (Acronal NX3250M) | 36.7% (CaCO3 + SB-432 + Oxylink 3101) | 1.05% (Tamol 165A + Acrysol RM-8W + Acrysol RM-2020) | 6.7% (TiO$_2$) | 9% water, 0.57% propylene glycol, 0.3% Carbodilite E-05 (crosslinker) |
| 10 | 43.4% Rovene 6120 | 32.9% CaCO$_3$ and 3.7% Wollastonite | 0.7% Tamol 165A + Acrysol RM-8W | 6.7% (TiO$_2$) | 10.4% water, other inactive ingredients to balance |
| 12 | 42.9% Rovene 6120 | 29.2% ATH and 7.3% Wollastonite | 1% Tamol 165A + Acrysol RM-8W | 6.7% (TiO$_2$) | 10.41% water, other inactive ingredients to balance |

TABLE II

Sample properties (note that Sample numbers correspond with the compositions shown in Table I).

| Sample # | Dry tensile strength (psi) | Wet tensile strength (psi) | Water infiltration (microns) | 60° C. Wet adhesion, pli |
|---|---|---|---|---|
| 1 (comparative) | 184 | 56 | 158 | 7.5 |
| 7 (comparative) | 158 | 21 | 388 | n/a |
| 9 (comparative) | 181 | 88 | 41 | 3.6 |
| 11 (comparative) | 185 | 108 | 72 | 3.4 |
| 2 | 196 | 92 | 118 | 7.4 |
| 3 | 180 | 97 | 54 | 4.6 |
| 4 | 260 | 87 | 44 | 2.6 |
| 5 | 327 | 95 | 28 | 6.6 |
| 6 | 246 | 85 | 20 | 2 |
| 8 | 192 | 70 | 71 | n/a |
| 10 | 247 | 93 | 40 | 2.8 |
| 12 | 251 | 130 | 66 | 3.7 |

Several observations can be drawn from inspection of Tables I and II. Samples 2 and 3 illustrate the improvement to water infiltration resistance and wet tensile strength compared with Comparative Sample 1. The improvements are believed to result from the use of hydrophobic additives. Samples 5 and 6 illustrate further improvements to the wet tensile strength and/or water infiltration properties of Sample 4, which is based upon a hydrophobic acrylic with high water infiltration resistance. Sample 5 makes use of Camel White™ ST (Imerys), a fine particle size, wet ground white calcitic marble. Sample 6 contains 15 wt % CaraPol AAR-127 as an additional hydrophobic additive. Sample 8 shows a significant improvement over Comparative Sample 7 in wet tensile strength and water infiltration resistance from the addition of nanofiller Oxylink as a functional filler, and crosslinking agent Carbodilite E-05. Sample 10 contains a blend of calcium carbonate and 3.7% wollastonite filler and shows a 36% increase in dry tensile strength relative to the comparative example 9 with only calcium carbonate. Sample 12 contains a blend of hydrophobically modified ATH and 7.3% wollastonite and shows a 36% increase in dry tensile strength and a 20% increase in wet tensile strength relative to the comparative example 11 with only hydrophobically modified ATH.

Example 2

A roofing formulation comprising at least one acrylic latex resin and at least one hydrophobic additive was obtained. In the present non-limiting example, the at least one hydrophobic additive was polyvinylidene fluoride (PVDF), Kynar from Arkema. The roofing formulation was applied to at least one roof substrate as described herein.

Following application of the roofing formulation to the at least one roof substrate, testing was performed to verify formation of the self-stratified, multi-layer coating system. In this case, 500 hours following application of the roofing formulation to the at least one substrate, testing was performed to verify formation of the self-stratified, multi-layer coating system. Specifically, surface energies at the top (i.e., the uppermost portion) of the coating system and at the core (i.e., at an interface abutting the at least one roof substrate) of the coating system were measured from the analysis of the contact angles via Owens-Wendt-Rabel-Kaelble model. In addition, water contact angles at the top of the coating system and at the core of the coating system were measured using KRUSS Mobile Surface Analyzer. Results are shown below in Table III.

TABLE III

| Measurement Location | Surface Energy (mN/m) | Water contact angle (°) |
|---|---|---|
| Top | 18.4 | 103.7 |
| Core | 24.6 | 84.4 |

As shown, the relatively lower surface energy and relatively higher water contact angle of the top surface indicated that the hydrophobic additive, which in the present non-limiting example, was PVDF, had segregated to the surface, while the acrylic latex resin (having a higher surface energy and lower water contact angle) segregated to the core. Such segregation indicated that a multi-layer, self-stratified coating had been formed on the at least one roof substrate.

Further indication that a multi-layer, self-stratified coating system had been formed on the at least one roof substrate can be seen in FIG. 1, which was also generated from the present non-limiting example. Particularly, FIG. 1 depicts an elemental map, measured using Energy-dispersive X-ray Spectrometry (EDX) of the present self-stratified, multi-layer coating system.

As shown in FIG. 1, the lighter color regions indicate the presence of fluorine. As shown, there is a higher concentration of the lighter color in the left-most region of the elemental map, which is circled in FIG. 1. This left-most region of the elemental map corresponds to a top region of the multi-layer, self-stratified coating system of the present example. The relatively higher presence of fluorine in the circled region of FIG. 1 therefore indicates that the hydrophobic additive (in this case PVDF), segregated away from the acrylic latex resin, toward a top of the at least one roof substrate, so as to form the present self-stratified, multi-layer coating system.

Conventional terms in the fields of materials science and engineering have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is adapted to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure and is submitted with the understanding that it will not be used to interpret or limit the scope or meaning of the claims.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

The invention claimed is:

1. A roofing system comprising:
    at least one roof substrate; and
    a multi-layer coating system, wherein the multi-layer coating system comprises:
        at least one top layer,
            wherein the at least one top layer comprises at least one hydrophobic additive; and
        at least one core layer,
            wherein the at least one core layer is disposed between the at least one top layer and the at least one roof substrate, and
            wherein the at least one core layer comprises at least one acrylic latex resin;
            wherein the at least one core layer is different from the at least one top layer.

2. The roofing system of claim 1, wherein the at least one hydrophobic additive comprises polyvinylidene fluoride (PVDF).

3. The roofing system of claim 2, wherein the roofing system further comprises a scrim, wherein the scrim is disposed between the at least one core layer of the multi-layer coating system and the at least one roof substrate.

4. The roofing system of claim 1, wherein the at least one hydrophobic additive comprises at least one of a hydrophobic copolymer dispersant, a salt of a hydrophobic copolymer dispersant, a nonionic rheology modifier, a polytetrafluoroethylene (PTFE) powder, a silicone surface additive, a polyolefin powder having a molecular weight of 100 kDa to 1000 kDa, or any combinations thereof.

5. The roofing system of claim 1, wherein the at least one acrylic latex resin comprises at least one of a hydrophobic resin, a self-crosslinking resin, a crosslinkable resin, or any combination thereof.

6. The roofing system of claim 1, wherein the at least one roof substrate comprises:
   at least one steep slope roof substrate,
      wherein the at least one steep slope roof substrate has a pitch of 4:12 to 12:12.

7. The roofing system of claim 1, wherein the at least one top layer has a surface energy of less than 20 mN/m.

8. The roofing system of claim 7, wherein the at least one core layer has a surface energy of at least 20 mN/m.

9. The roofing system of claim 1, wherein the at least one top layer has a surface energy of 1 mN/m to 20 mN/m.

10. The roofing system of claim 9, wherein the at least one core layer has a surface energy of 20 mN/m to 50 mN/m.

11. The roofing system of claim 1, wherein the at least one top layer has a surface energy that is less than a surface energy of the at least one core layer.

12. The roofing system of claim 1, wherein the at least one top layer comprises 0.5% to 20% by weight of the at least one hydrophobic additive based on a total weight of the at least one top layer.

13. The roofing system of claim 1, wherein the at least one core layer comprises 20% to 70% by weight of the at least one acrylic latex resin based on a total weight of the at least one core layer.

14. The roofing system of claim 1, wherein the at least one top layer further comprises 25% to 65% by weight of at least one functional filler based on a total weight of the at least one top layer.

15. The roofing system of claim 14, wherein the at least one functional filler comprises at least one of a silica, a wollastonite, a mica, a kaolin, a feldspar, a nepheline syenite, an aluminum hydroxide, a magnesium hydroxide, an aluminum trihydrate, a basalt, a nano-zinc oxide, a platy silica, a treated fumed silica, a non-treated fumed silica, a nano-kaolin, a nano-bentonite, a nano-monomonilorite, or any combination thereof.

16. The roofing system of claim 15, further comprising at least one pigment, wherein the at least one pigment is different from the at least one functional filler.

17. The roofing system of claim 1, wherein the at least one core layer further comprises 25% to 65% by weight of at least one functional filler based on a total weight of the at least one core layer.

18. The roofing system of claim 17, wherein the at least one functional filler comprises at least one of a silica, a wollastonite, a mica, a kaolin, a feldspar, a nepheline syenite, an aluminum hydroxide, a magnesium hydroxide, an aluminum trihydrate, a basalt, a nano-zinc oxide, a platy silica, a treated fumed silica, a non-treated fumed silica, a nano-kaolin, a nano-bentonite, a nano-monomonilorite, or any combination thereof.

19. The roofing system of claim 18, further comprising at least one pigment, wherein the at least one pigment is different from the at least one functional filler.

20. The roofing system of claim 1, wherein, when the multi-layer coating system is tested at a dry film thickness of 500 microns, the multi-layer coating system exhibits, after 4 hours at 60° C. and 95% relative humidity, a water infiltration depth of 120 microns or less.

* * * * *